(12) United States Patent
Amrine, Jr. et al.

(10) Patent No.: US 7,828,304 B2
(45) Date of Patent: Nov. 9, 2010

(54) PNEUMATIC VEHICLE JACKING SYSTEM

(75) Inventors: James Meredith Amrine, Jr., Ann Arbor, MI (US); James W. Grant, Royal Oak, MI (US)

(73) Assignee: Altair Engineering, Inc., Troy, MI (US)

( * ) Notice: Subject to any disclaimer, the term of this patent is extended or adjusted under 35 U.S.C. 154(b) by 635 days.

(21) Appl. No.: 11/687,990

(22) Filed: Mar. 19, 2007

(65) Prior Publication Data
US 2007/0216121 A1 Sep. 20, 2007

Related U.S. Application Data

(60) Provisional application No. 60/783,211, filed on Mar. 17, 2006.

(51) Int. Cl.
B62D 61/12 (2006.01)
(52) U.S. Cl. .................... 280/86.5; 280/6.157
(58) Field of Classification Search .......... 280/86.5, 280/124.157, 6.157, 683
See application file for complete search history.

(56) References Cited

U.S. PATENT DOCUMENTS

| 3,197,231 | A | | 7/1965 | Holzman |
| 4,315,631 | A | | 2/1982 | Rainville |
| 4,711,464 | A | * | 12/1987 | Bilas .......................... 280/86.5 |
| 4,854,409 | A | | 8/1989 | Hillebrand et al. |
| 4,856,814 | A | * | 8/1989 | Jones ......................... 280/86.5 |
| 5,035,439 | A | | 7/1991 | Petrillo |
| 5,868,418 | A | * | 2/1999 | VanDenberg .............. 280/86.5 |
| 5,915,705 | A | | 6/1999 | VanDenberg |
| 6,007,078 | A | | 12/1999 | Gottschalk et al. |
| 6,439,587 | B2 | * | 8/2002 | Fabris .................. 280/124.11 |
| 6,997,464 | B2 | | 2/2006 | Yakimishyn |
| 7,222,867 | B2 | | 5/2007 | Rotz et al. |

OTHER PUBLICATIONS

WABCO, ECAS-Electronically Controlled Air Suspension for Commercial Vehicles, Brochure.
Arvin Meritor, Air Suspension Service, Catalog.

* cited by examiner

*Primary Examiner*—Paul N Dickson
*Assistant Examiner*—Karen Jane J Amores
(74) *Attorney, Agent, or Firm*—Young Basile

(57) ABSTRACT

The present invention is an apparatus or device for jacking an individual axle of a truck or a truck trailer having an air line. The device includes a valve in fluid communication with the air line, a first air bag in fluid communication with the valve, and a second air bag in fluid communication with the first air bag.

5 Claims, 6 Drawing Sheets

PNEUMATIC VEHICLE JACKING SYSTEM

RELATED APPLICATIONS

This application is a continuation of U.S. Provisional Application Ser. No. 60/783,211 filed Mar. 17, 2006.

FIELD OF THE INVENTION

The present invention relates in general to a vehicle jacking system, and more particularly to a pneumatic jacking system for selectively immobilizing a vehicle axle assembly.

BACKGROUND

In the trucking industry, pneumatic suspension systems are commonly used in attaching axles to a truck or a truck trailer. In a pneumatic suspension system, each axle is attached to the truck or truck trailer using suspension members and pressurized air bags. The air bags are generally attached between each axle and the frame or body of the truck or a frame or bed of the truck trailer.

A drawback of current pneumatic suspension systems is an inability to separately control a supply of air delivered to each axle individually. Operation of a representative pneumatic suspension system 100 according to the prior art is schematically illustrated in FIG. 8. In this example, the prior art system 100 is shown to include three axles 104, 106, and 108. Attached to each axle is a pair of suspension air bags arranged at opposite ends of the axle. Axle 104 includes air bags 112 and 132; axle 106 includes air bags 116 and 128; and axle 108 includes air bags 120 and 124. A pressurized air supply 110 delivers a flow of compressed air to each of the air bags. The air bags are shown fluidly connected in series. An air line 114 fluidly connects air supply 110 to air bag 112 associated with axles 106. Air bag 112 in turns is fluidly connected to air bag 116, associated with axle 106, via air line 118. Air line 122 fluidly connects air bag 116 to air bag 120, which in turn is fluidly connected to air bag 124 via air line 126. Air bags 120 and 124 are associated with axle 108. Air bag 124 is fluidly connected to air bag 128, associated with axle 106, via air line 130. Lastly, an air line 134 fluidly connects air bag 128 to air bag 132, associated with axle 104. Compressed air from air supply 110 passes sequentially through air bags 112, 116, 120, 124, 128, and 132. This particular arrangement, however, does not easily allow the air bags to be individually controlled. Thus, it would be desirable to provide a pneumatic suspension system with the ability to individually control the air supply to each set of air bags associated with a particular axle.

SUMMARY

The present invention is an apparatus or device for jacking an individual axle of a truck or a truck trailer having an air line. The device includes a valve in fluid communication with the air line, a first air bag in fluid communication with the valve and attachable between the axle and the truck/truck trailer, and a second air bag in fluid communication with the first air bag and attachable between the axle and the truck/truck trailer.

BRIEF DESCRIPTION OF THE DRAWING

The various features, advantages and other uses of the present invention will become more apparent by referring to the following detailed description and drawings, in which.

DETAILED DESCRIPTION

Figure 1:
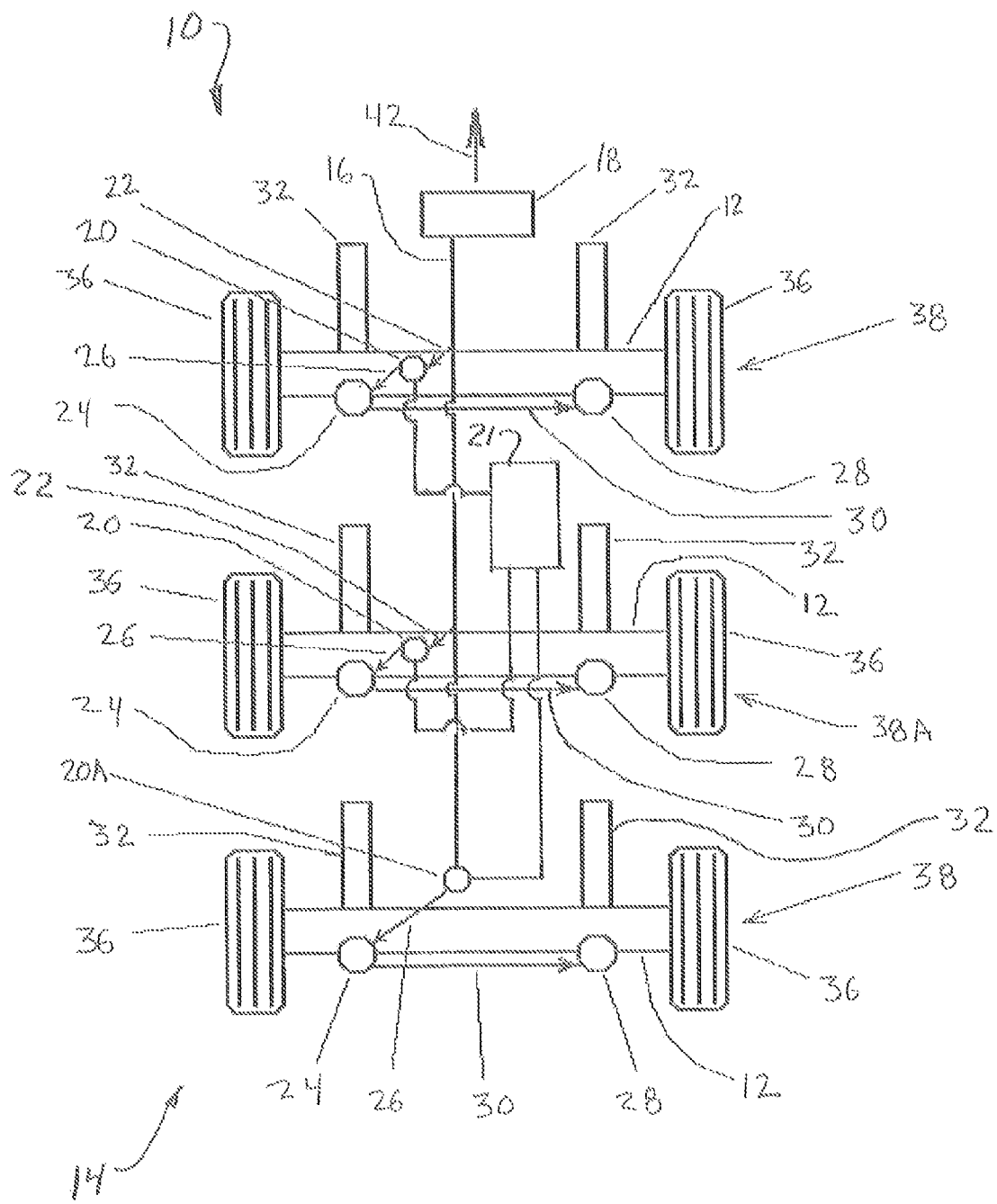
FIG. 1 is a schematic top elevational view of a vehicle suspension system employing the pneumatic jacking system of the present invention.
Figure 6:
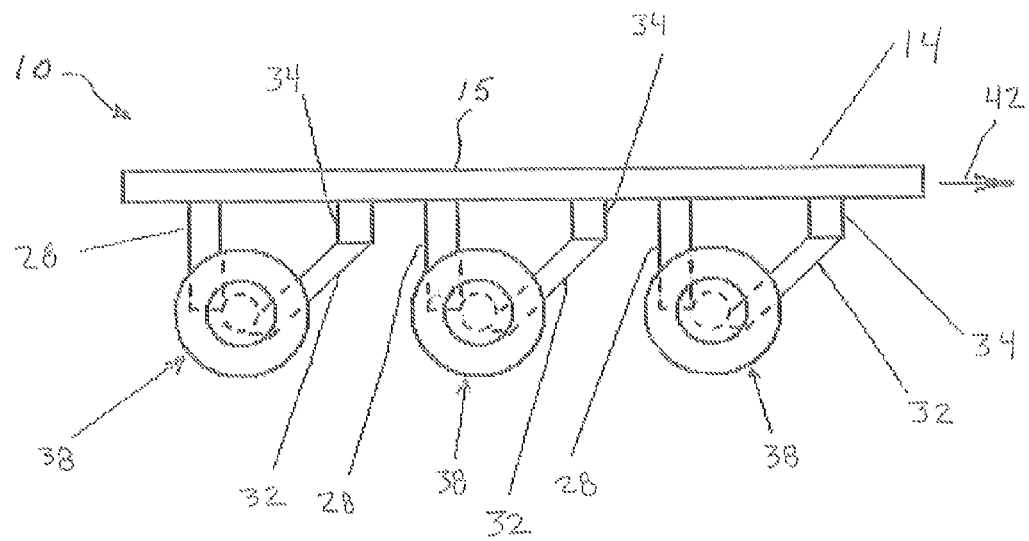
FIG. 6 is a side elevational view of the jacking system with all three axles deployed in a normal operating mode in which the vehicle is supported by all three axles.
Figure 7:
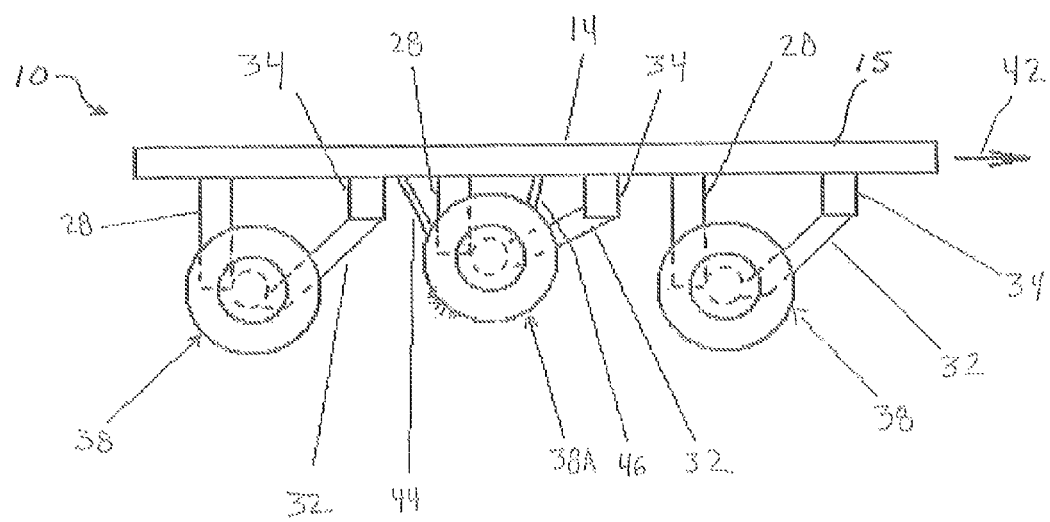
FIG. 7 is a side elevational view of the jacking system showing a damaged axle assembly suspended from a body of the vehicle.
Figure 8:
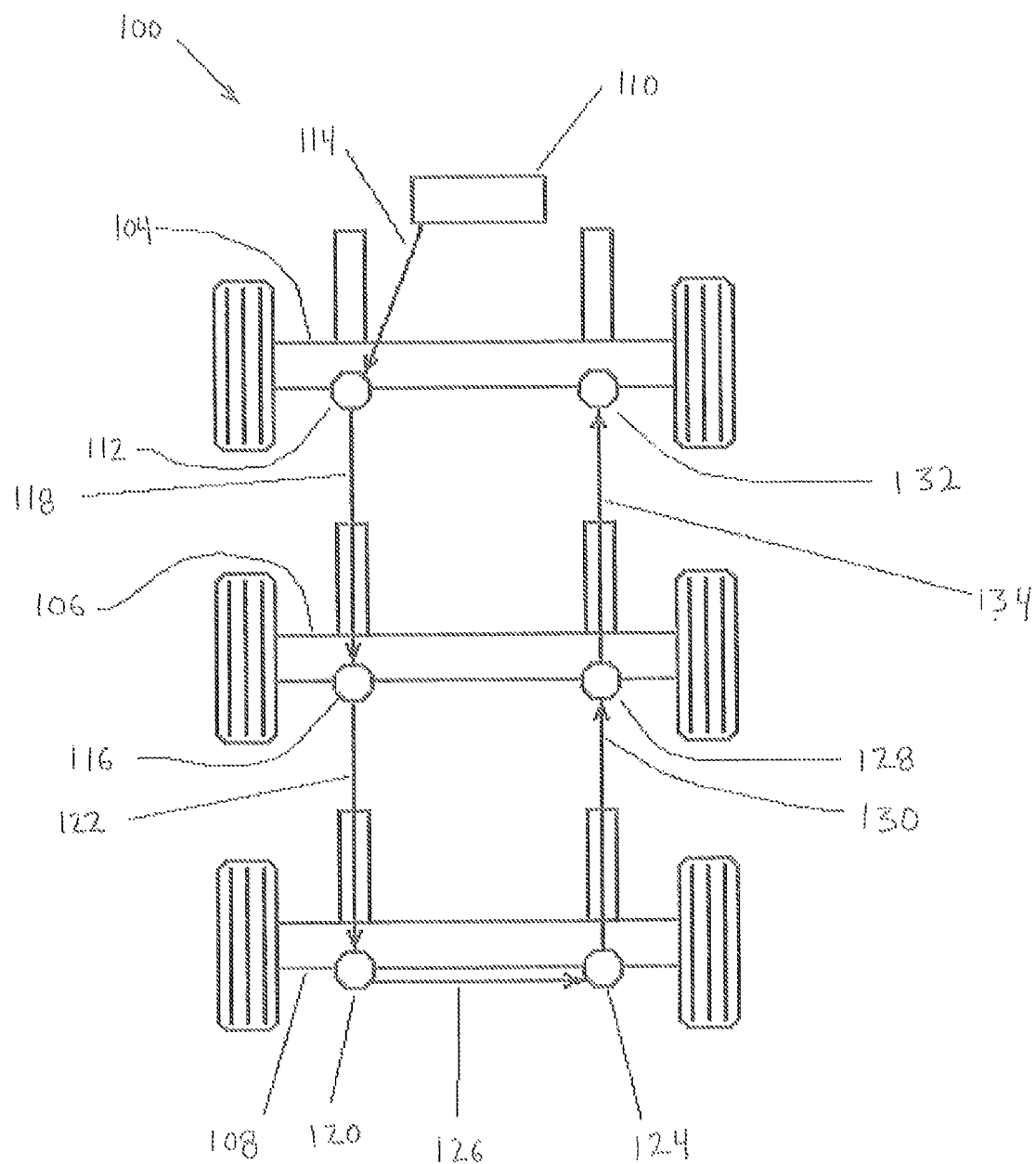
FIG. 8 is a schematic top elevational view of a pneumatic suspension system according to the prior art.

Referring to FIG. 1, a pneumatic jacking system 10 is shown. Jacking system 10 can be used for jacking an axle 12 of a truck or a truck trailer 14 (hereinafter referred to as vehicle 14), as shown in FIGS. 6 and 7. Although vehicle 14 is shown to include three axles, it shall be appreciated that jacking system 10 may also be utilized with vehicles having a different number of axles.

Pneumatic jacking system 10 may include a valve 20 fluidly connected to an air line 16 via a valve inlet line 22. Operation of valve 20 may be suitably controlled by means of a known controller 21. Air line 16 is fluidly connected to a compressed air source 18 for supplying a stream of compressed air to the jacking system. Valve 20 is in fluid communication with a first suspension air bag 24 via a valve outlet line 26. First suspension air bag 24 is in turn fluidly connected to a second suspension air bag 28, via an air line 30. A stream of compressed air from air source 18 can be used to selectively inflate air bags 24 and 28. The flow of compressed air from air source 18 passes through air line 16 and inlet line 22 to valve 20. From valve 20 the air travels through valve outlet line 26 to first suspension air bag 20 and onto second suspension air bag 28 through air bag line 30.

Pneumatic jacking system 10 may also include a valve 20A directly connected to and in fluid communication with air line 16, without the need for a valve inlet line. Operation of valve 20A may be suitably controlled by means of a controller 21. Valve 20A is in fluid communication with first suspension air bag 24 via valve outlet line 26. First suspension air bag 24 is in turn fluidly connected to second suspension air bag 28, via air bag line 30. A stream of compressed air from air source 18 flows through air line 16 to valve 20A fluidly connected to first suspension air bag 24. The air then travels through air bag line 30 to second suspension air bag 28.

Figure 2:
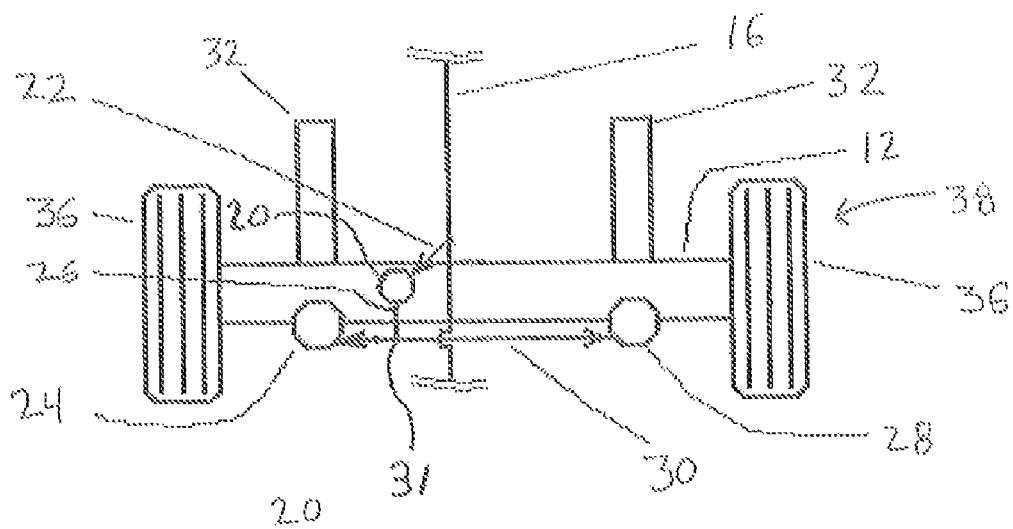
FIGS. 2 and 3 are schematic top elevational views showing a pair of suspension air bags associated with a particular axle fluidly connected in parallel.
Figure 3:
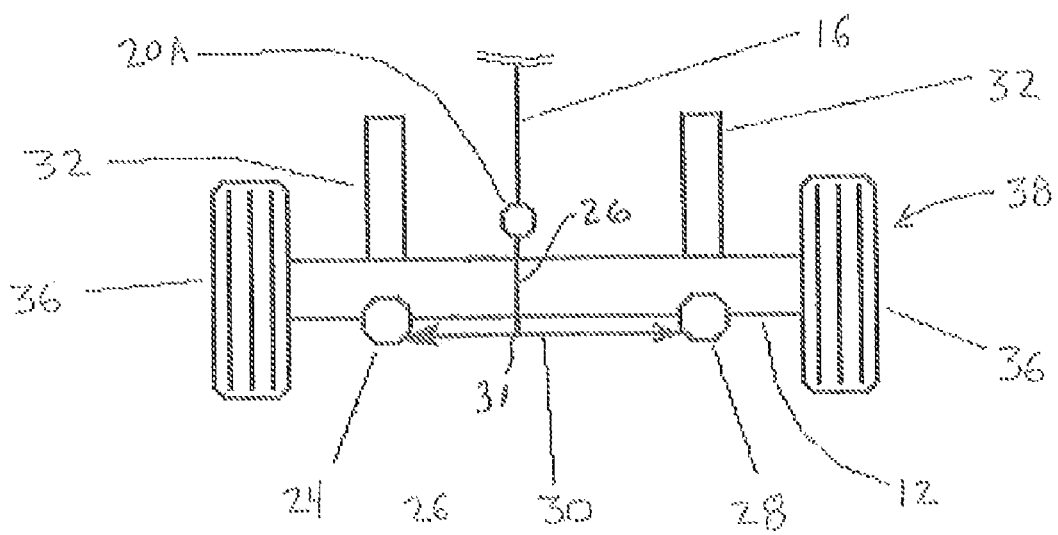

Referring also to FIGS. 2 and 3, a pair of suspension air bags 24 and 28 associated with a particular axle may also be fluidly connected to air line 16 in parallel, rather than in series as shown in FIG. 1. For example, valve outlet line 26 may be fluidly connected to air bag line 30, rather than first suspension air bag 24. Compressed air from air supply 18 travels through valve 20,20A, which is fluidly connected to air bag line 30 at fluid junction 31. The compressed air stream divides into two streams at fluid junction 31, with a portion of the air flow traveling to suspension air bag 24 and the remaining portion to suspension air bag 28.

Figure 4:
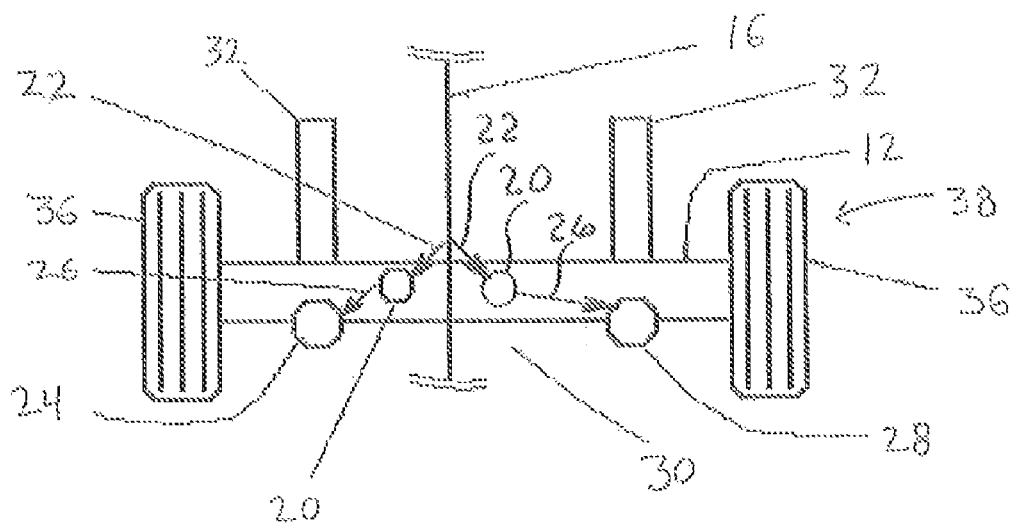
FIGS. 4 and 5 are schematic top elevational views of the suspension system employing a separate fluid valve for each suspension air bag.
Figure 5:
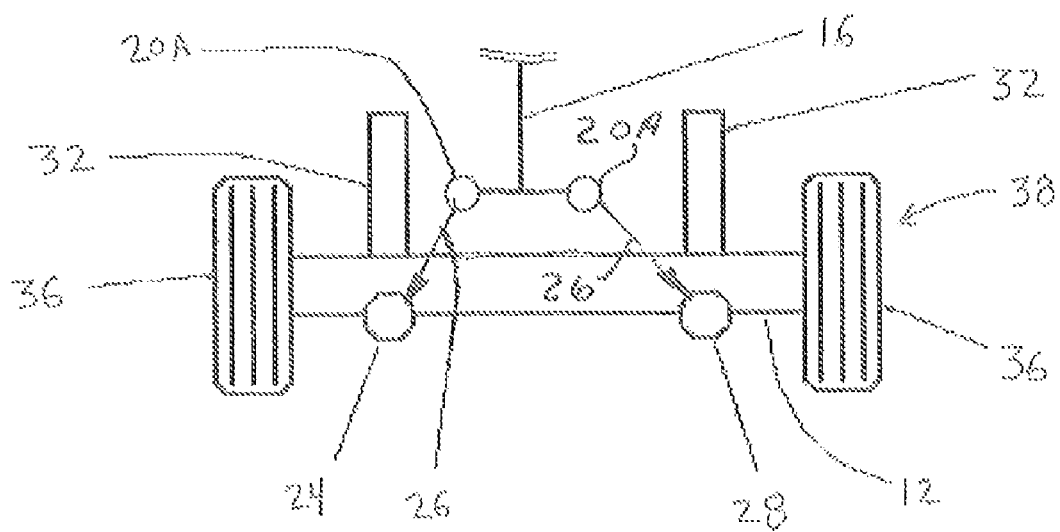

Referring also to FIGS. 4 and 5, the air supply to each of the multiple suspension air bags may also be individually controlled by providing a separate valve 20,20A for each individual air bag. A separate valve 20,20A fluidly connects each suspension air bag 24 and 28 to air line 16. When utilizing this configuration, it is preferable that any given pair of valves 20 associated with a common axle 12 be operable in unison, thereby enabling air bags 24 and 28 attached to a common axle 12 to be simultaneously inflated and deflated.

As shown in FIGS. 6 and 7, each axle 12 is suitably attached to a body/trailer bed 15 of vehicle 14 using a pair of suspension members 32, each of which is connected to a frame member 34 of vehicle 14. Axle 12 is additionally attached to body/trailer bed 15 by air bags 24 and 28, which are attached between axle 12 and body/trailer bed 15. At least one tire and wheel assembly 36 may be attached to each end of the axle 12. Each tire/wheel/axle assembly 38 includes an axle 12 and the attached tire and wheel assembly 36.

Operation of a pneumatic jacking system 10 will now be described. The front of vehicle 14 is indicated in the figures by directional arrow 42. Each axle 12 is included in one tire/wheel/axle assembly 38 or one damaged tire/wheel/axle assembly 38A (see FIG. 7). Under normal operating conditions, as shown in FIG. 6, compressed air from air source 18 pressurizes jacking system 10 using air source 18 connected to air line 16. Valves 20,20A can be opened to pressurize and inflate air bags 24 and 28 associated with each of the three axles. Under normal operating conditions, all three of the tire/wheel/axle assemblies 38 may be used to support vehicle 14.

In instances where a portion of tire/wheel/axle assembly 38 becomes damaged or otherwise inoperable, a maintenance or limp-home driving operation can be implemented as is illustrated in FIG. 7. In this example, the damaged tire/wheel/axle assembly 38A is located between the two undamaged tire/wheel/axle assemblies 38, i.e. in a second position from the front of the truck trailer 14. Damaged assembly 38A may be immobilized by reducing or dumping the air pressure to jacking system 10 via air source 18. Alternatively, a separate pressure release valve may be located downstream of each valve 20,20A, which can be opened to depressurize and deflate air bags 24,28. After air bag 24,28 is deflated, valve 20,20A associated with damaged tire/wheel/axle assembly 38A is shut off or closed to block compressed air from air source 18 from being delivered to the two air bags. The damaged tire/wheel/axle assembly 38A is then secured in an elevated or suspended position relative to the undamaged tire/wheel/axle assembly 38 using straps 44,46. Straps 44,46 may have one end attached to body/trailer bed 15 of vehicle 14, and an opposite end to a portion of damaged tire/wheel/axle assembly 38A. Straps 44,46 may also consist of a single continuous strap, with a portion of the strap engaging damaged tire/wheel/axle assembly 38A. Straps 44,46 may consist of a chain, cable, woven nylon material, or another suitably strong material having sufficient strength to support damaged tire/wheel/axle 38A in the elevated or suspended position. With tire/wheel/axle assembly 38A suitably suspended from body/trailer bed 15, the air pressure within jacking system 10 is recharged via air source 18, pressurizing and inflating the air bags 24,28 associated with the undamaged tire/wheel/axle assemblies 38. Vehicle 14 is now supported by the two undamaged tire/wheel/axle assemblies 38. The damaged tire/wheel/axle assembly 38A can now be worked on, or vehicle 14 can be driven to a different location for repair.

Upon repairing the damage to tire/wheel/axle assembly 38A, air bags 24,28 associated with undamaged tire/wheel/axle assemblies 38 can be deflated to allow the tires of previously damaged tire/wheel/axle 38A to engage the ground. Straps 44,46 are then removed and the entire jacking system is repressurized via air source 18 to inflated air bags 24,26 associated each of the axles, including the newly repaired axle, enabling vehicle 14 to once again be supported by all three axles.

Figure 9:
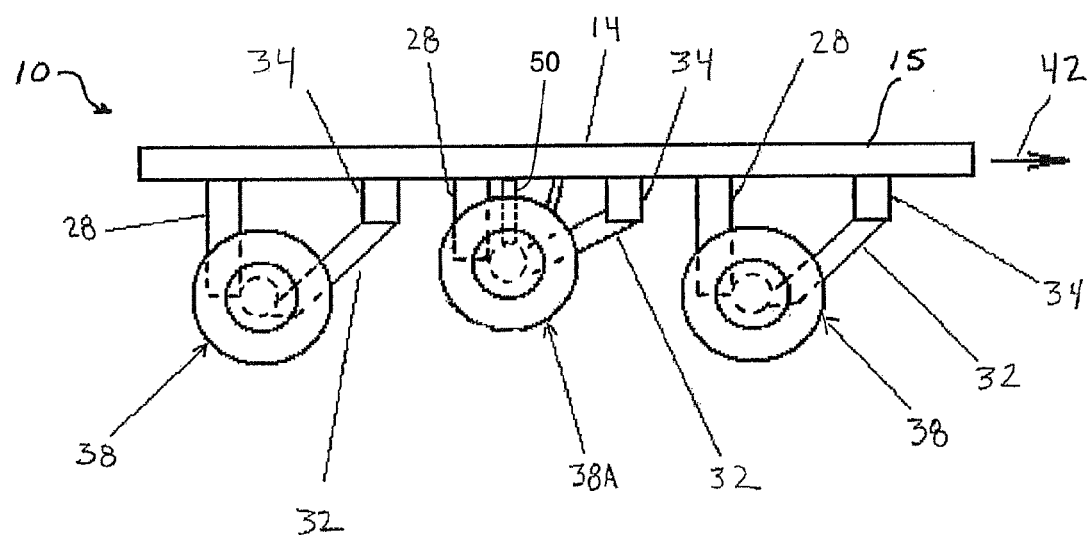
FIG. 9 is a schematic side elevational view of the jacking system showing an axle held in a predetermined fixed position relative to the body of the vehicle by a latch.

The jacking system 10 may include a latch 50 for holding the axle 12 in a predetermined fixed position relative to the body/trailer bed 15, as shown schematically in FIG. 9. The latch 50 has one end thereof connected to the body/trailer bed 15 of the vehicle 14 and is selectively engageable with the axle 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for immobilizing a wheel of a vehicle, the method comprising:

recognizing the vehicle as including a body, a first axle having a first wheel for supporting a body of the vehicle relative to a ground surface, the first axle connected to the body by a first air bag for selectively moving the first axle between a first distance relative to the vehicle body and a second distance relative to the vehicle body, a second axle having a second wheel for supporting the vehicle body relative to the ground surface, connected to the body by a second air bag for selectively moving the second axle between the first distance relative to the vehicle body and the second distance relative to the vehicle body, and at least one pressurized air source supplying a flow of pressurized air to the first and second air bags, the second wheel displaced relative to the first wheel along a longitudinal axis of the vehicle, the first and second wheel contacting the ground surface;

depressurizing the first air bag while the first and second wheel are contacting the ground surface;

mechanically securing the first axle to the vehicle body to maintain the first axle at the first distance relative to the vehicle body after depressurizing the first air bag; and disengaging the first wheel from the ground surface by raising the vehicle body relative to the second wheel while the first axle remains mechanically secured to the vehicle body at the first distance relative to the vehicle body after mechanically securing the first axle to the vehicle body.

2. The method of claim 1 further comprising engaging the first wheel with the ground surface by lowering the vehicle body relative to the second axle.

3. The method of claim 1, wherein mechanically securing the first axle at a first distance relative to the vehicle body comprises preventing movement of the first axle relative to the vehicle body while the first air bag remains depressurized.

4. The method of claim 1, wherein mechanically securing the first axle to the vehicle body comprises providing straps for suspending the first axle from the vehicle body at the first distance relative to the vehicle body and performing the step of mechanically securing the first axle to the vehicle body using the straps.

5. The method of claim 1, wherein mechanically securing the first axle to the vehicle body comprises providing a latch for holding the first axle at the first distance relative to the vehicle body and performing the step of mechanically securing the first axle to the vehicle body by engaging the latch with the first axle.

\* \* \* \* \*